(12) United States Patent
Song et al.

(10) Patent No.: US 6,493,095 B1
(45) Date of Patent: Dec. 10, 2002

(54) OPTIONAL 3D DIGITIZER, SYSTEM AND METHOD FOR DIGITIZING AN OBJECT

(75) Inventors: Li Song, Boucherville (CA); Yvan Bourassa, Lac-Beauport (CA); Dominique Beauchamp, Québec (CA); Guylain Lemelin, Ste-Foy (CA)

(73) Assignee: Inspeck Inc., Montreal (CA)

( * ) Notice: Subject to any disclaimer, the term of this patent is extended or adjusted under 35 U.S.C. 154(b) by 0 days.

(21) Appl. No.: 09/548,232

(22) Filed: Apr. 12, 2000

(30) Foreign Application Priority Data

Apr. 13, 1999  (CA) .............................................. 2267519

(51) Int. Cl.$^7$ .............................................. G01B 11/24
(52) U.S. Cl. .................... 356/603; 382/154; 250/237 G
(58) Field of Search ................................ 356/601, 602, 356/603, 604, 605, 607, 608, 611, 613, 2; 250/237 G; 382/154

(56) References Cited

U.S. PATENT DOCUMENTS

| | | | |
|---|---|---|---|
| 3,619,033 A | 11/1971 | McMahon | 350/162 |
| 3,705,261 A | 12/1972 | Langley | 178/6.5 |
| 4,622,462 A | 11/1986 | Eaton et al. | 250/236 |
| 4,702,257 A | 10/1987 | Moriyama et al. | 128/653 |
| 4,775,235 A | 10/1988 | Hecker et al. | 356/376 |
| 4,803,645 A * | 2/1989 | Ohtomo et al. | 356/376 |
| 4,842,411 A * | 6/1989 | Wood | 356/376 |
| 4,957,369 A | 9/1990 | Antonsson | 356/376 |
| 5,037,207 A | 8/1991 | Tomei et al. | 356/444 |
| 5,198,877 A | 3/1993 | Schulz | 356/375 |
| 5,276,546 A | 1/1994 | Palm et al. | 359/202 |
| RE34,566 E | 3/1994 | Ledley | 128/660.07 |
| 5,307,151 A * | 4/1994 | Hof et al. | 356/376 |
| 5,307,152 A * | 4/1994 | Boehnlein et al. | 356/376 |
| 5,313,265 A | 5/1994 | Hayes et al. | 356/345 |
| 5,315,512 A | 5/1994 | Roth | 364/413.25 |
| RE34,749 E * | 10/1994 | Leong et al. | 356/376 |
| 5,377,011 A | 12/1994 | Koch | 356/376 |
| 5,386,124 A | 1/1995 | Yasuda et al. | 250/585 |
| 5,418,608 A | 5/1995 | Caimi et al. | 356/3.01 |
| 5,432,703 A | 7/1995 | Clynch et al. | 364/474.05 |
| 5,440,496 A | 8/1995 | Andersson et al. | 364/474.05 |
| 5,465,284 A | 11/1995 | Karellas | 378/62 |
| 5,559,712 A | 9/1996 | Kihara et al. | 364/468.25 |
| 5,561,526 A * | 10/1996 | Huber et al. | 356/376 |
| 5,630,034 A | 5/1997 | Oikawa et al. | 395/124 |
| 5,668,894 A | 9/1997 | Hamano et al. | 382/242 |
| 5,747,822 A | 5/1998 | Sinclair et al. | 250/559.19 |
| RE35,816 E | 6/1998 | Schulz | 356/376 |
| 5,804,830 A | 9/1998 | Shafir | 250/559.22 |
| 5,815,275 A | 9/1998 | Svetkoff et al. | 356/376 |
| 5,842,473 A | 12/1998 | Fenster et al. | 128/660.09 |
| 5,850,290 A | 12/1998 | Horiguchi et al. | 356/376 |
| 5,851,115 A | 12/1998 | Carlsson et al. | 433/215 |
| 5,864,640 A | 1/1999 | Miramonti et al. | 382/312 |
| 6,028,672 A * | 2/2000 | Geng | 356/376 |

* cited by examiner

Primary Examiner—Hoa Q. Pham
(74) Attorney, Agent, or Firm—Altera Law Group, LLC

(57) ABSTRACT

An optical 3D digitizer for digitizing an object, comprises a white light source producing white light, a projection lens projecting the white light toward the object whereby the object has a fully illuminated side, a grating device producing a fringe pattern in the light projected by the projection lens, and first and second cameras positioned aside from the projection lens and aligned in angled directions with respect to each other so that the cameras have complementary fields of view directed on the illuminated side of the object and partially overlapping with each other over a depth of measurement of the object. The cameras have respective video outputs to produce video signals representing complementary images of the object with a common image portion as a result of the fields of view being partially overlapping.

20 Claims, 7 Drawing Sheets

Image 1
$I_i(i, j)$

Image 2
$I_2(i, j)$

Image N
$I_N(i, j)$

OPTIONAL 3D DIGITIZER, SYSTEM AND METHOD FOR DIGITIZING AN OBJECT

FIELD OF THE INVENTION

The present invention relates to an optical 3D digitizer, a system based on the digitizer and a corresponding method for digitizing an object, for example a full human being. The present invention has numerous applications, for example for computer-assisted 3D vision, human body digitizing, computer animation, computer graphics, electronic gaming, 3D electronic archiving, 3D web, reverse engineering and medical 3D imaging.

BACKGROUND 3D digitizing, particularly non-contact optical 3D digitizing techniques, became commercially available during the recent years. Most of these techniques are based on the principle of optical triangulation. Despite the fact that passive optical triangulation (stereo vision) has been studied and used for many years for photogrametic measurements, the active optical triangulation technique (particularly laser scanning technique) gained popularity because of its robustness and simplicity to process obtained data using a computer. Most of the systems based on the active optical triangulation principle were developed for industrial applications, such as robotic assembly, robot guidance, industrial inspection, reverse engineering, etc.

As an example of such technique, a laser beam or a laser stripe is projected on a 3D surface of an object, scattering the laser beam or laser stripe on the surface. It is measured using a photo-electronic device. A signal can be generated to indicate the position (usually the depth) of the measured point. In most cases, the basic measurements are either a point or a section profile. A mechanical or optical scanning device is usually used to provide a frame of 3D measurements. For industrial applications, mechanical scanning can be accomplished by the mechanism on which the digitizing device is mounted, such as a robot or a conveyer. The scanning process consists of a sequential data acquisition process and takes a relatively longer time to scan a surface. During the scanning, the object should be kept immobilized; this is a major problem when scanning a live being. Different techniques, such as the projection of multiple stripes, laser line scanning during one video frame and high speed scanning, have been developed. These approaches are either too expensive to realize, or their sampling rate is still too low compared to 2D digital imaging.

A laser beam is a monochromatic light source. One single monochromatic laser beam can not provide full color information of the measured surface. On the other hand, a number of today's 3D applications including computer animation, electronic games, 3D web, 3D archiving and 3D medical imaging require information on color texture which contributes to most of the visual effects. In order to measure the color texture of a surface, a 3D digitizing system based on a laser scanning principle must use multiple laser sources (blue, green and red lasers) or use a second camera to get color data. The first solution is very difficult to be implemented and is also very expensive. The second can suffer from problems of misalignment between 3D geometric data and color texture data because they are not captured from the same angle of the view.

When digitizing a full human body, the required ratio between height and width of the measured zone should be 2 to 3 over 1. A system based on laser scanning is more flexible to provide a desired ratio, but its acquisition speed is too slow. All other systems using frame capturing of a CCD camera are limited by the geometric form of the sensor. Most of commercially available CCD sensors have an aspect ratio equal either to 4 or 3 over 1. If such a sensor is used to cover a human body possibly higher than 2 meters, the resulting lateral resolution would be very low. At the same time, many of the pixels are not useful for a measurement.

Known in the art are U.S. Pat. No. 3,619,033 (McMahon); U.S. Pat. No. 3,705,261 (Langley); U.S. Pat. No. 4,622,462 (Eaton et al.); U.S. Pat. No. 4,702,257 (Moriyama et al.); U.S. Pat. No. 4,775,235 (Hecker et al.); U.S. Pat. No. 4,957,369 (Antonsson); U.S. Pat. No. 5,037,207 (Tomei et al.); U.S. Pat. No. 5,198,877 (Schulz); U.S. Pat. No. 5,276,546 (Palm et al.); U.S. Pat. No. 5,313,265 (Hayes et al.); U.S. Pat. No. 5,315,512 (Roth); U.S. Pat. No. 5,377,011 (Koch); U.S. Pat. No. 5,386,124 (Yasuda et al.); U.S. Pat. No. 5,418,608 (Caimi et al.); U.S. Pat. No. 5,432,703 (Clynch et al.); U.S. Pat. No. 5,440,496 (Andersson et al.); U.S. Pat. No. 5,465,284 (Karellas); U.S. Pat. No. 5,559,712 (Kihara et al.); U.S. Pat. No. 5,630,034 (Oikawa et al.); U.S. Pat. No. 5,668,894 (Hamano et al.); U.S. Pat. No. 5,747,822 (Sinclair et al.); U.S. Pat. No. 5,804,830 (Shafir); U.S. Pat. No. 5,815,275 (Svetkoff et al.); U.S. Pat. No. 5,842,473 (Fenster et al.); U.S. Pat. No. 5,850,290 (Horiguchi et al.); 5,851,115 (Carlsson et al.); U.S. Pat. No. 5,864,640 (Miramonti et al.); U.S. Pat. No. Re. 34,566 (Ledley); and U.S. Pat. No. Re. 35,816 (Schulz). The above-mentioned patent documents provide a global idea of the state of the art.

SUMMARY

An object of the invention is to address the various weaknesses in the existing optical 3D digitizers, and to provide a reliable solution for a cost-effective system.

Another object of the invention is to provide a digitizer, a system based on such a digitizer and a digitizing method which are relatively much faster than the presently available digitizers, digitizing systems and methods.

According to the present invention, there is provided an optical 3D digitizer for digitizing an object, comprising a white light source adapted to produce white light, a projection lens optically coupled to the white light source and arranged to project the white light toward the object whereby the object has a fully illuminated side, a grating device optically coupled between the white light source and the projection lens for selectively producing a fringe pattern in the light projected by the projection lens, and first and second cameras positioned aside from the projection lens and aligned in angled directions with respect to each other so that the cameras have complementary fields of view directed on the illuminated side of the object and partially overlapping with each other over a depth of measurement of the object, the cameras having respective video outputs to produce video signals representing complementary images of the object with a common image portion as a result of the fields of view being partially overlapping.

According to the present invention, there is also provided an optical 3D digitizer system for digitizing an object, comprising the aforesaid optical 3D digitizer provided with a control circuit connected to the white light source and the grating device, and a computer including a frame grabber having inputs for receiving the video signals from the cameras, the computer having a communication link with the control circuit of the digitizer.

According to the present invention, there is also provided an optical 3D digitizing method for digitizing an object, comprising the steps of: projecting white light toward the object using a single white light source, whereby the object has a fully illuminated side; selectively producing a fringe pattern in the light projected on the object; and capturing complementary images of the object illuminated by the white light using first and second cameras positioned aside from the white light source and aligned in angled directions with respect to each other so that the cameras have complementary fields of view directed on the illuminated side of the object and partially overlapping with each other over a depth of measurement of the object, the cameras having respective video outputs to produce video signals representing the complementary images of the object with a common image portion as a result of the fields of view being partially overlapping.

The following provides a non-restrictive summary of embodiments and certain features of the invention which are described with more details hereinafter.

The optical 3D digitizer according to the invention can be used in particular for digitization of a full human body. The cameras can be embodied by two standard color (color version) or monochromatic (B/W version) cameras. The white light source can be embodied by a projector. The two cameras are set in a way that over all the depth of the measurement, their captured images are always overlapped. The two images from two cameras can be merged to form one single image. Incidentally, the aspect ratio of combined image varies between 2 to 3 over 1. One or a few combined images will provide 3D measurement of one view of a human body. The acquisition time of one view requires a fraction of a second using commercially available standard cameras and frame grabbers. The cameras used for the measurement of 3D geometry provide also the capturing of color or gray scale texture, depending on the cameras. Since the same image pixel of the camera measures the 3D geometry and texture data of a point on a 3D surface, the texturing mapping on top of 3D geometry is automatically ensured by the nature of this data acquisition. The 3D digitizer based on the present invention does not need two image sensors to separately measure 3D geometry and texture and avoids the problem of misalignment occurring with laser scanning systems.

Different approaches can be taken for the 3D coordinate measurements. A first one uses one video frame containing a projected fringe pattern and a second one requires a few video images which also contain a projected fringe pattern. An image processing based on the analysis of the mechanical interference pattern provides the 3D coordinate data for each image pixel. An encoding process is applied for conversion of the measurement in computer units to real physical parameters. A set of encoding points is generated by the projected pattern and the absolute positions of these points can be determined once they are measured by the cameras. In fact, a function describing the absolute positions of the encoding points and their measured position on the photo sensitive area of the cameras can be defined experimentally after a digitizer is assembled. Each camera should preferably capture at least one encoding point. The encoding point ensures first the conversion of the measurement in computer unit to real physical parameters for the whole surface and indicates the geometric relation of the 3D images measured by each of the two cameras. A fine tuning procedure using the 3D data on the overlapped surface gives final adjustment to the positions of the two images. Both 3D geometric data and texture data acquired by the two cameras can be merged to form one single 3D model with one single texture image.

A defocusing optical element which removes fringe patterns from the image and provides a uniform illumination can be used. In order to keep light intensities similar for two images grabbed using two separate cameras, a procedure for light intensity adjustment is implemented, using the average light intensity measured on the overlapped area of the two images. The data obtained from each camera should be calibrated in a common coordinate for both cameras. Both 3D geometric data and texture data acquired by the two cameras are merged to form one single 3D model with one single texture image. A complete model of a human body can be thereby created using a single or multiple optical full human body 3D digitizers according to the invention.

An image of 640×480 pixels can be grabbed using one standard NTSC camera. Although there is an overlapped area between the two video images captured by the two cameras, the final merged image can still keep at least 1100 to 1200×480 pixels. These image pixels are distributed over a field of view corresponding to the form of a human body. So, there are no wasted image pixels. In addition, this number of sampling over the field of view ensures a very reasonable lateral resolution for final 3D measurement. The number of image pixels captured by each camera is limited either by industrial standards (for example, NTSC or PAL) or by the manufacturing cost of the camera. This limitation does not apply to the projected pattern. In fact, the only limit for a projected pattern (for example, a film) is the optical resolution of the film and projection optics. It is not uncommon to obtain a resolution of 50 to 100 lines per mm on a pattern to be projected which may have a size of 35 mm×25 mm. So one projected pattern can easily provide the necessary image information for the area covered by the two cameras. The major advantage of using one single projector instead of two is to avoid the cross-talking results from simultaneous captured images and two fringe patterns if two projectors were used.

The necessary acquisition time of the system according to the present invention is much shorter than most of existing techniques based on laser scanning principles and many more data points can be measured on a person who does not need special training to be kept immobilized for several seconds.

Different approaches can be taken to create a complete model of a human body using one or multiple optical full human body 3D digitizers according to the present invention. When one digitizer is used to capture multiple views of a human body, one has to rotate the person to be digitized or rotate the digitizer around the person so that each necessary view can be measured. Each sequential measurement of the surfaces preferably overlaps with the others. It is not necessary to know the exact position of each acquisition. The texture and geometric data on the overlapped area can be used to ensure the registration of each partial model. In order to reduce the total acquisition time, it is possible to use a number of 3D digitizers mounted in a fixed space. Four to six digitizers are usually needed to minimize uncovered surfaces. When this approach is used, the procedure for the registration becomes more simple because the positions of each view are well known.

BRIEF DESCRIPTION OF THE DRAWINGS

A detailed description of preferred embodiments will be given herein below with reference to the following drawings, in which like numbers refer to like elements.

DETAILED DESCRIPTION OF THE PREFERRED EMBODIMENTS

Figure 1:
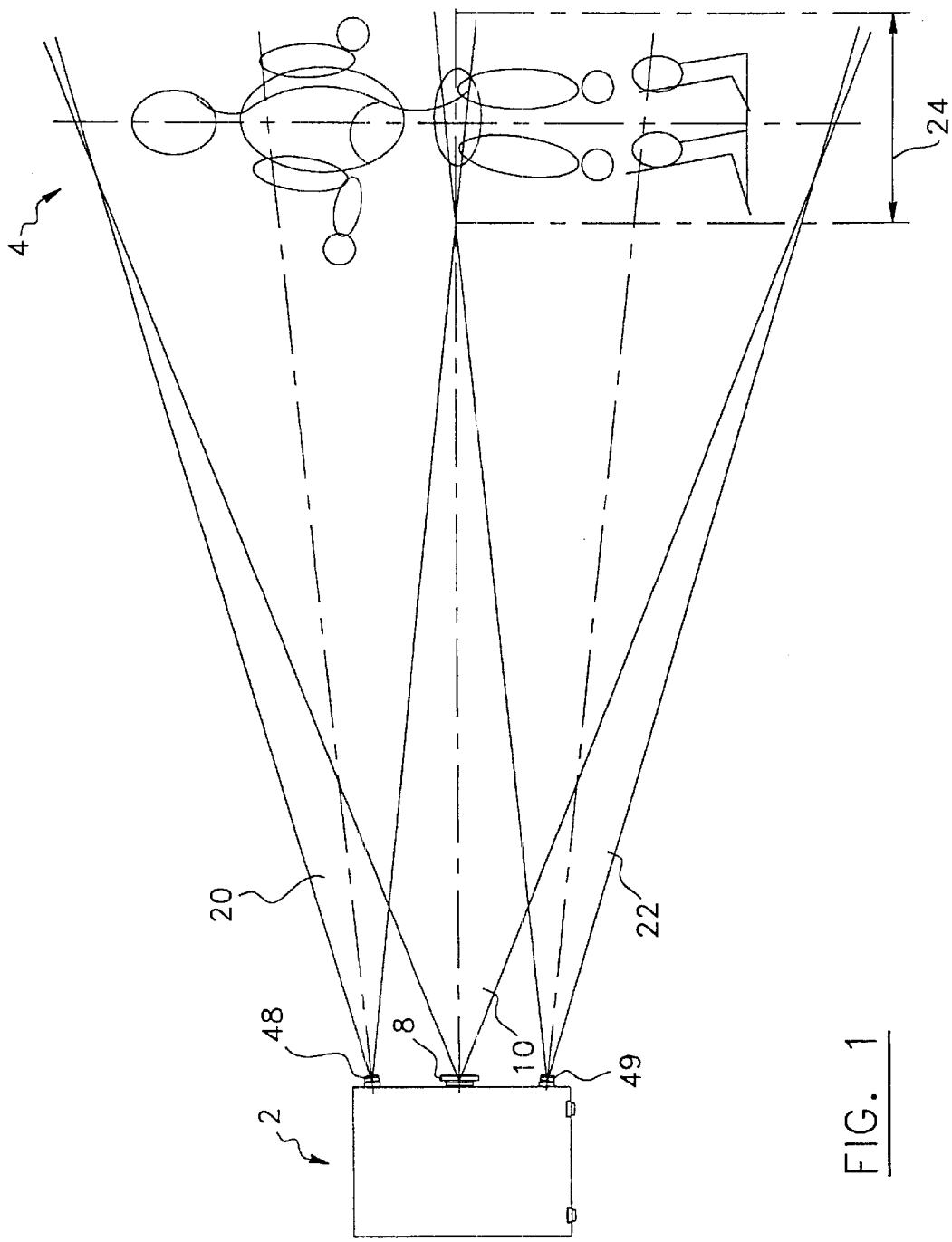
FIG. 1 is a schematic diagram illustrating a digitizer according to the present invention, used to digitize a human body.
Figure 2:
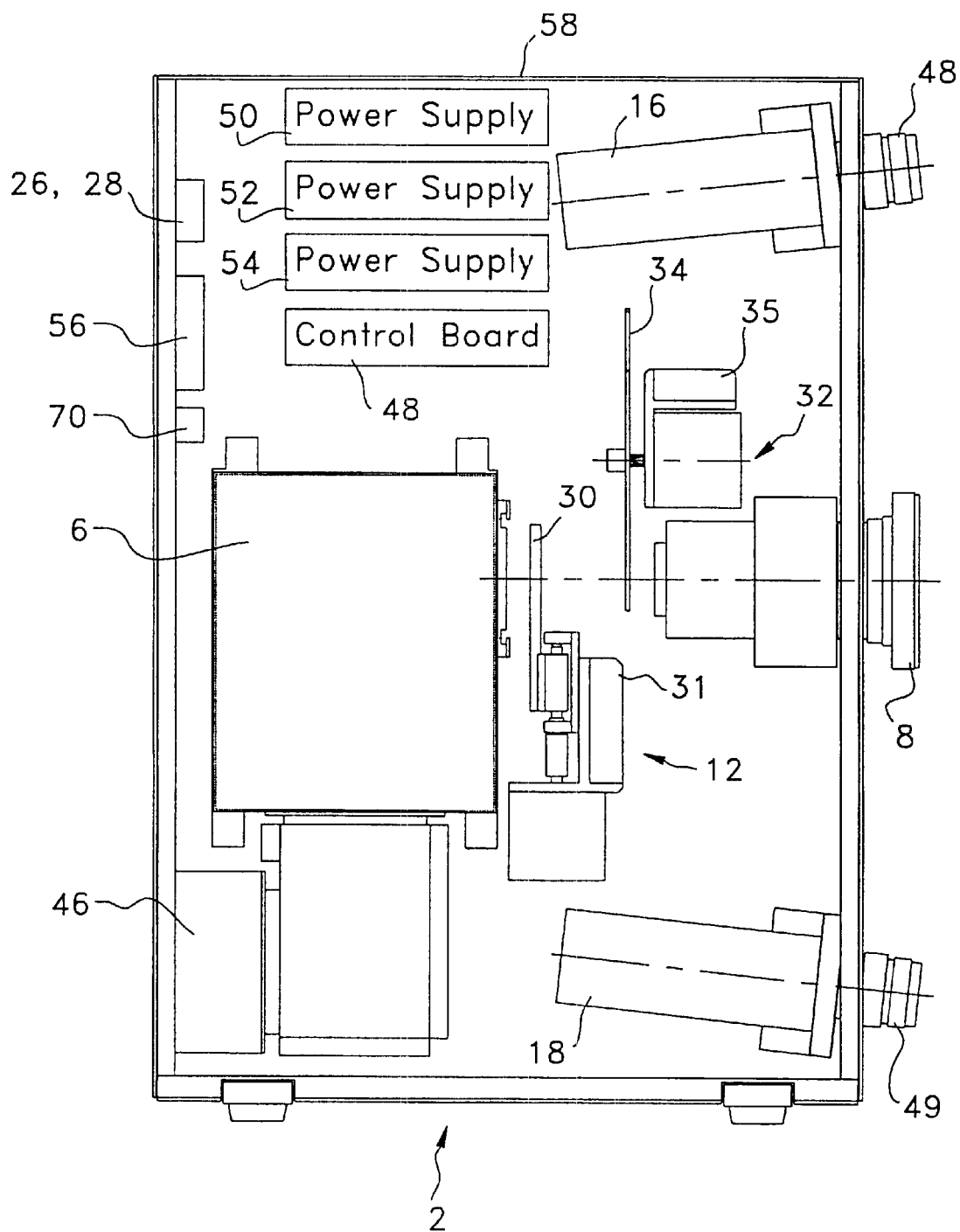
FIG. 2 is a schematic diagram illustrating an embodiment of the digitizer according to the present invention.

Referring to FIGS. 1 and 2, there is shown an optical 3D digitizer 2 according to the present invention, for digitizing an object, e.g. a full human body 4 in the illustrated case (see FIG. 1). A casing 58 is preferably provided to enclose the various components of the digitizer 2.

The digitizer 2 has a white light source 6 adapted to produce white light. A projection lens 8 is optically coupled to the white light source 6 and arranged to project the white light 10 toward the object 4 whereby the object 4 has a fully illuminated side. A grating device 12 is optically coupled between the white light source 6 and the projection lens 8, for selectively producing a fringe pattern 14 (like the one illustrated in FIG. 4) in the light 10 projected by the projection lens 8. First and second cameras 16, 18 are positioned aside from the projection lens 8 and aligned in angled directions with respect to each other so that the cameras 16, 18 have complementary fields of view 20, 22 directed on the illuminated side of the object 4 and partially overlapping with each other over a depth of measurement 24 of the object 4. The cameras 16, 18 may be CCD cameras having respective video outputs 26, 28 preferably accessible on a rear side of the casing 58, to produce video signals representing complementary images of the object 4 with a common image portion as a result of the fields of view 20, 22 being partially overlapping.

The cameras 16, 18 are preferably mounted on opposite sides of the projection lens 8, although they can be mounted next to each other and more or less close to the projection lens 8 if desired, insofar as it remains possible to direct them on the illuminated side of the object 4 with their fields of view 20, 22 partially overlapping with each other over the desired depth of measurement 24. In other words, the cameras 16, 18 can be positioned anywhere (even outside the casing 58) provided that they capture images having identical or similar view planes and having especially a common portion for the reasons explained hereinafter.

Figure 7A:
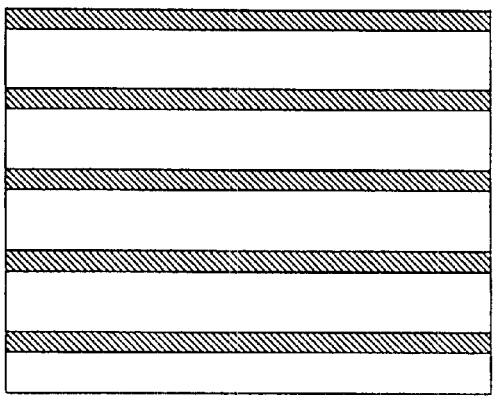
FIGS. 7A–C are schematic diagrams illustrating examples of fringe pattern displacements carried out by a digitizer according to the present invention.
Figure 7B:
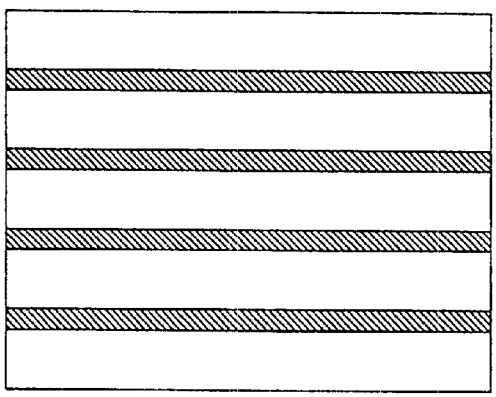
Figure 7C:
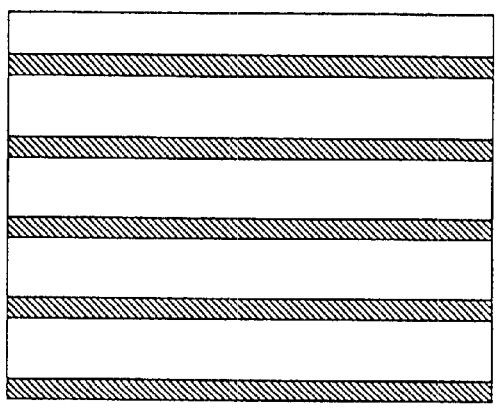

The grating device 12 is preferably formed of a grating slide 30 extending across the white light produced by the source 6, and a motor unit 31 (or any other suitable actuator) arranged to controllably move the slide 30 transversely with respect to the white light to shift the fringe pattern produced in the light 10 projected by the projection lens 8, as depicted in FIGS. 7A–C. The capture and processing of images including the fringe pattern with different shifts increase the accuracy of the measurements over a single image including a single, unshifted fringe pattern. Yet, it should be understood that such a pattern shifting process is optional as proper results may be obtained without fringe pattern shifting.

Preferably, the digitizer 2 is provided with a multi-functional optical device 32 formed for example of a rotatable disk 34 having circumferentially distributed optical elements selectively moveable in optical registry with the grating device 12 and the projection lens 8 by controlled rotation of the disk 34, and a motor unit 35 (or any other suitable actuator) arranged to controllably rotate the disk 34.

Figure 3:
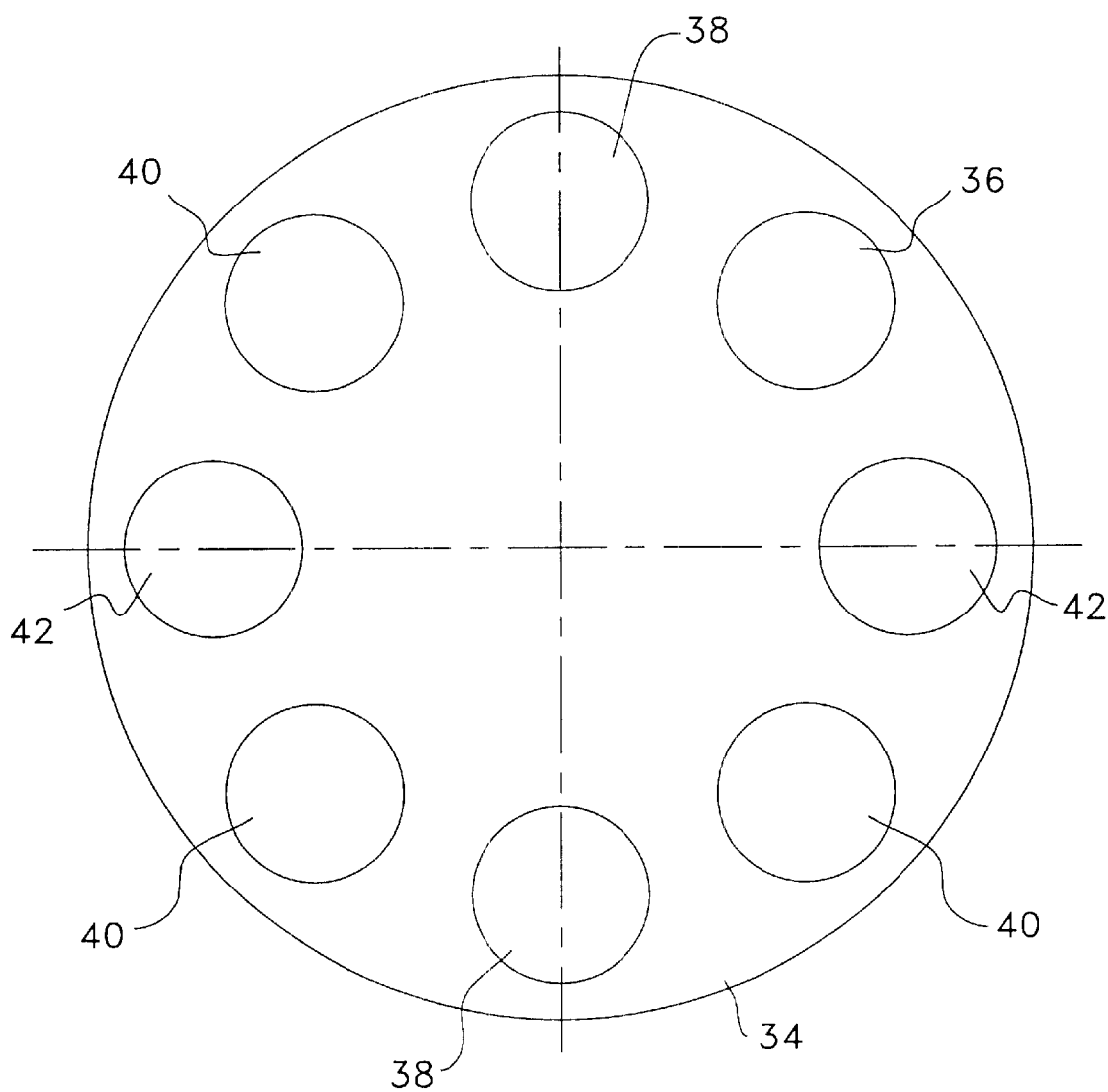
FIG. 3 is a schematic diagram illustrating an embodiment of a multi-functional motorized disk for a digitizer according to the present invention.

Referring to FIG. 3, the optical elements provided on the disk 34 may include an aperture 36, one or more shutters 38, one or more filters 40, and one or many defocusing elements 42 suppressing the fringe pattern 14 produced by the grating device 12 and providing uniform illumination by the white light 10 projected on the object 4. The use of these optical elements 36, 38, 40, 42 will become apparent hereinafter.

Figure 4:
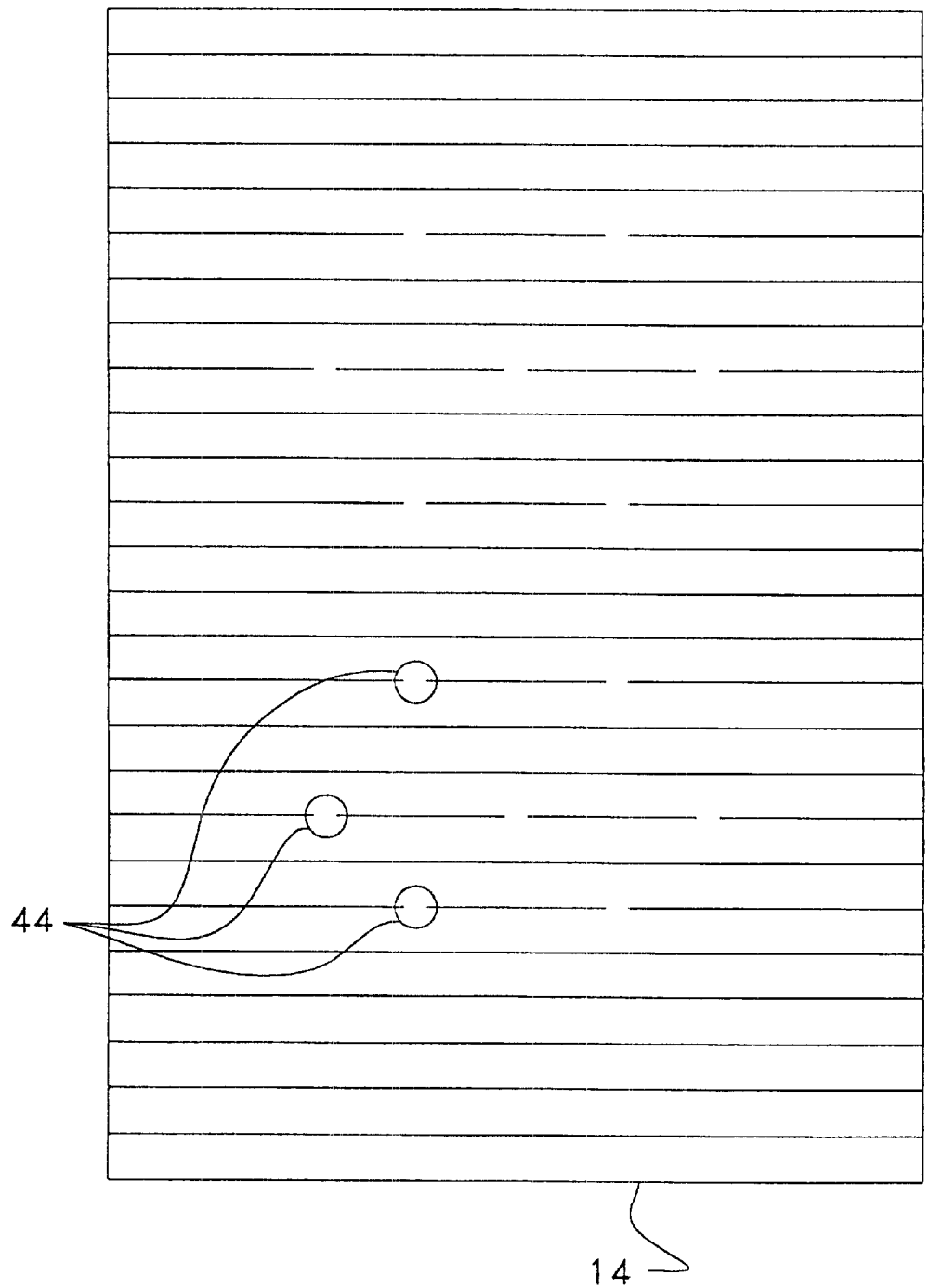
FIG. 4 is a schematic diagram illustrating an example of a projected pattern with encoding points that can be projected by a digitizer according to the present invention.

Referring to FIG. 4, the fringe pattern 14 preferably includes a set of encoding points 44 having absolute 3D positions determinable in the images captured by the cameras 16, 18 using experimentally predefined functions. The encoding points 44 are preferably positioned so that each one of the cameras 16, 18 captures at least one of the encoding points 44.

Referring to FIG. 2, color and/or monochromatic versions of the digitizer 2 can be provided depending on the type of the cameras 16, 18 used and, of course, the needs of the user. In operation, the pattern 14 (as shown in FIG. 4) is illuminated by the white light source 6 and projected by the projection lens 8. The white light source 6 can be for example a white light projector. A cooling system 46 can be provided to keep the digitizer 2 at an acceptable temperature when necessary. The deformed pattern due to the relief of a person's body 4 is captured by the two cameras 16, 18 through their lenses 48, 49. Some overlap must be kept between the two fields of view 20, 22 covered by the two cameras 16, 18. The two cameras 16, 18, the white light source 6, the motor units 31, 35, and a main control board 48 of the digitizer 2 are powered by a power supply with, for example, three outputs 50, 52, 54 providing appropriate voltage levels, the power supply receiving energy through a connector 56 preferably disposed on the rear side of the casing 58.

Figure 5:
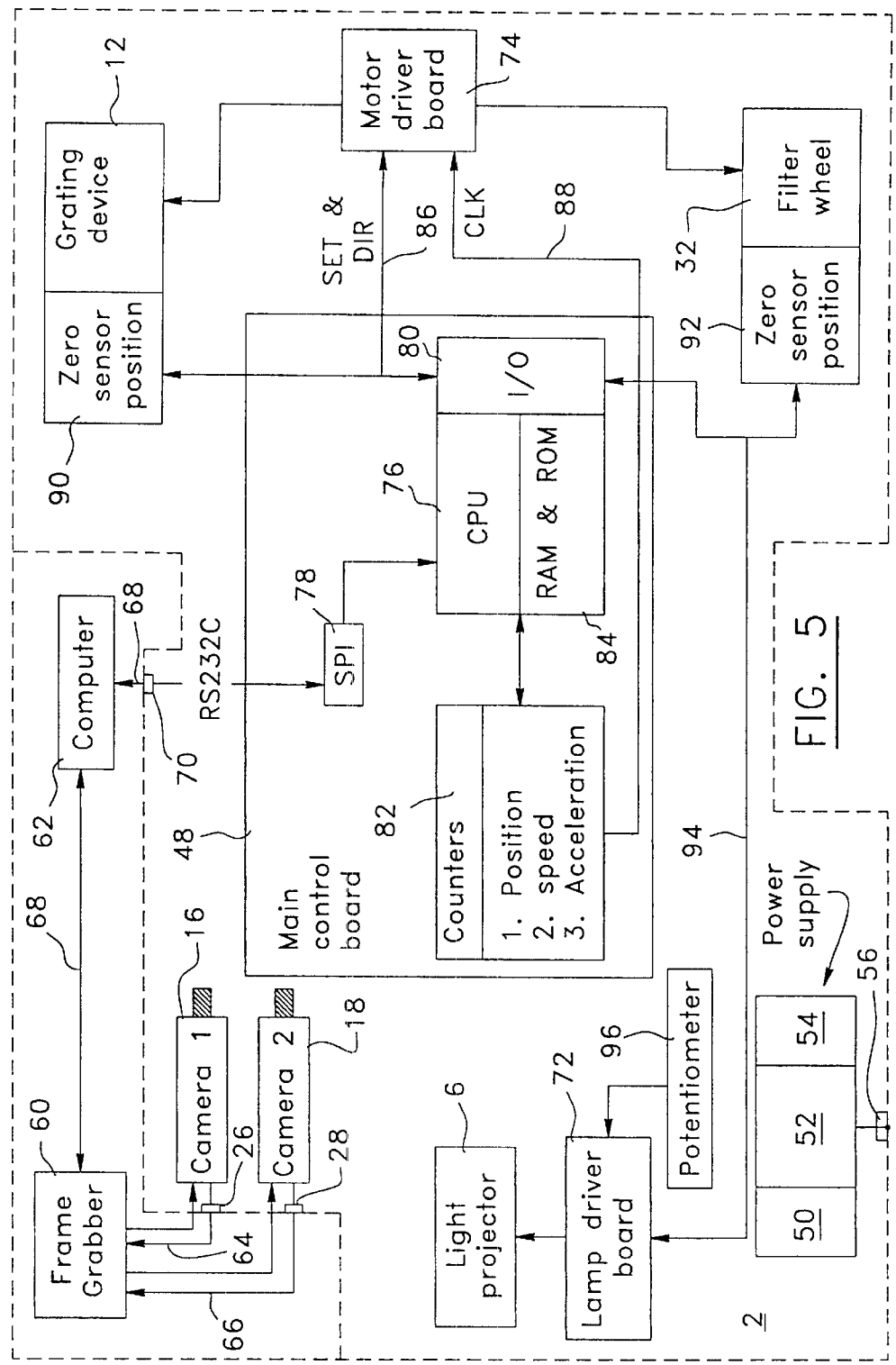
FIG. 5 is a block diagram illustrating an embodiment of a system including a digitizer according to the present invention.

Referring to FIG. 5, there is shown a system using the digitizer 2 according to the present invention. The system includes a frame grabber 60 for acquiring the video signals produced by the cameras 16, 18, and a computer 62 for processing the data converted by the frame grabber 60 and communicating with the digitizer 2 for operation control and timing purposes. The video signals produced by the cameras 16, 18 are transmitted to the frame grabber 60 for example via two video cables 64, 66 connected to the connectors 26, 28. The frame grabber 60 can be mounted in an available computer slot for direct connection to a computer bus 68. A number of patterns can be captured for different pattern positions obtained by shifting the projected pattern 14 (as shown in FIGS. 7A–C) by displacement of the grating slide 30. The pattern shifting and the illumination lighting are preferably controlled via the main control board 48 by the computer 62 through a cable 68 connected to a control cable connector 70 preferably disposed on the rear side of the casing 58 (see FIG. 2). The intensity of the lighting can also be controlled by a lamp driver board 72. The motor units 31, 35 of the grating and multi-functional devices 12, 32 can be driven by a common motor driver board 74, these optical components being used to provide different functions in the image acquisition process.

For every recording sequence, a set of video images is processed into a suitable software application to retrieve the 3D information from the structured images, along with the texture information. Different algorithms can be used for retrieving the shape and texture information from the video images using a projected structured light. In most cases, a hybrid algorithm based on interferometric techniques and active triangulation with different assumptions can be used. The algorithm can be applied for example to 3 frames (and more) recording with temporal phase shifting as depicted in FIGS. 7A–C. An algorithm can also be applied to successfully process a single frame, though the resulting modeling will generally have a lower resolution.

Phase shifting algorithms will allow for extracting the 3D information for every pixel of the video images acquired during the recording. Linked with a very low acquisition time (few video images), this feature is a major advantage compared to other optical 3D measurement techniques.

From one sequence of video images with structured light projection, the 3D data set can be extracted for every pixel of a given camera 16 or 18, with or without the texture image. As the structured light was projected on the object 4 with known position values, a set of equations can be built to represent the phase function of the object 4 for that particular recording. This can be viewed as determining the pixels' positions relative to one another. The phase function is defined through an algorithm developed for every sampled point, the pixels of the video image. The algorithm allows for the retrieval of the phase function in a limited range, from 0 to 2 pi radians.

The phase function can be expressed for example as:

$$\phi(i, j) = F(I_1(i, j), I_2(i, j), \ldots, I_N(i, j)) = [0, 2\pi[$$

From the characteristics of each camera 16 or 18 and the frame grabber 60, the precision in intensity for each digitized level can be extracted.

Once the phase function is defined for every pixel of the image, a phase unwrapping algorithm developed for speed and robustness, is used. The algorithm is preferably speed optimized for use on a mid-range PC (or any computer type) with a decent processing time but also with some robustness against noisy pixels, bad lightning conditions, bad surface conditions, or errors in the measurement.

The phase unwrapping function can be expressed for example as:

$$P\{\phi(i, j)\} = \theta(i, j) + \phi(i, j)$$

As the phase function is first expressed in a modulo $2\pi$, when the value of a complete discontinuity on a 3D surface is bigger than $1\pi$, it is possible to get errors in the phase unwrapping algorithm, with an integral number of order, i.e. a multiple of $2\pi$ in the phase. Before going through the data conversion process, it is necessary to correct these measurement discontinuities with a discontinuity tracking algorithm. After the application of this algorithm, the unwrapped phase function is ready to be processed with the conversion to real unit algorithm.

A set of reference points 44 is encoded into the structured light 14 projected on the object 4 (see FIG. 4). These encoding points 44 allows for the absolute, but low resolution, measurement of the 3D coordinates at the corresponding points on a given surface of the object 4. On the other hand, the interference phase function provides the higher resolution position for every points of the image covering the object.

The phase function, once unwrapped, is now ready to be converted into real coordinates, like millimeters. From a calibration table created based on each digitizer 2, the measurement of every sampled point is converted to geometric units. This process corrects any distortion in the 3D measurement.

The conversion function can be expressed for example as:

$$C(\theta(i, j) + \phi(i, j)) = \text{conversion from } (i, j) \text{ to mesh } (x, y, z) \text{ in mm.}$$

With the video images processed for retrieving the 3D data set for the object 4, a numerical algorithm can also be applied to calculate the texture image from the structured light projection 14. The texture image is a video image showing in gray scale or in color the optical intensity of the measured surface. This texture image can be mapped onto the 3D data set to increase the realism of the numerical 3D model obtained.

A special video image obtained with the use of the defocusing device 42 can also be used. In that case, this supplementary image shows the color of the object 4 without the structured light 14 projected on it. This technique avoids the residual structured light pattern caused by slight movement of the object 4 during the digitizing process.

The texture image building process can be expressed for example as:

$$T(i, j) = F_T(I_1(i, j), I_2(i, j), \ldots, I_N(i, j)) \text{ or } F_T(I_{N+1}(i, j))$$

Since the digitizer 2 has two cameras 16, 18 and one light projector 6, one of the major problems to be dealt with is to balance the colors and the light intensity between the two cameras 16, 18. This should be done to ensure that there is no discontinuity in the combined texture frame. There are two operations that can be carried out: correctly balancing the iris apertures of the cameras 16, 18 (manual adjustment during raw image acquisition) and automatic color balancing achieved at processing time (even in the case of a perfect manual mean intensity balance, it is important to automatically balance the colors because the cameras 16, 18 will not be perfectly calibrated, and even if they were so, their responses would probably not be the same at different light intensity levels).

The algorithms use the overlapped regions to compute the mean intensity and the color ratios. Since these two regions cover the same area, they give the gain factors required to correct the image from each camera 16 or 18.

A manual iris aperture adjustment algorithm can be implemented as follows. During live video stage, the mean intensities are measured on both overlapped regions after each acquisition and their values are written on the computer's screen beside an indicator that can be red when the difference is larger than a given tolerance and that turns green when the mean intensities match within the same given tolerance. The adjustment is thus done in real time by the operator by opening or closing the iris on the cameras 16, 18.

An automatic color balance algorithm can be implemented as follows (preferably, this balance may be enabled or disabled by the operator). First, the program in the computer 62 computes the mean values for each R, G and B channels on both overlapped regions. It then computes a mean value and a gain factor for each one of them (so there are obtained two gain factors in R, etc., one being slightly larger than 1.0 and one being slightly smaller than 1.0). The gain factors are applied on each color channel of each image to make them match together. Because the mean light intensity is assumed to be balanced (even roughly) between both images, the color modification should not suffer too severely from a mismatching due to a difference of illumination.

The control system of the invention can be embodied by three electronic modules: the main control board 48, the motor driver board 74 and the lamp driver board 72. Each control board 48, 72, 74 is powered by the appropriate power supply output 50, 52 or 54.

The main control board 48 receives and transmits commands from and to the computer 62 for example via a RS-232C asynchronous serial bus 68. The board 48 has a CPU 76, a SPI (Serial Peripheral Interface) 78, an input/output interface 80, counters 82 and RAM and PROM memories 84 for data and program. The commands that are recognized by the board are, for example:

- positioning, setting the velocity and the acceleration of the motor unit 31 (see FIG. 2) that pulls and pushes on the grating slide 30;
- resetting the position of the grating slide 30;
- positioning, setting the velocity and the acceleration of the motor unit 35 (see FIG. 2) that turns the multi-functional (filter) disk 34;
- resetting the position of the multi-functional disk 34;
- turning the light of the projector 6 ON and OFF.

The control board 48 transmits direction and start signals 86 to each motor units 31, 35. Positioning, velocity and acceleration information are transmitted to counters 82. The counters 82 generate a square pulse at a variable frequency. The position is equal to the number of rising edges in the signal 88 transmitted to the motor driver board 74, the velocity being equal to the frequency at which these edges are transmitted, and the acceleration of the rate being equal to the velocity changes.

For the reset operation, the grating device 12 and the multi-functional disk device 32 have position sensors 90, 92 that transmit an electrical signal to the CPU 76 via the I/O interface 80.

The lamp driver board 72 receives an ON/OFF signal 94 via the main control board 48. The intensity of the lamp 6 can be manually adjusted with a potentiometer 96.

The cameras 16, 18 are controlled by the frame grabber 60 directly plugged in the computer bus 68.

Figure 6:
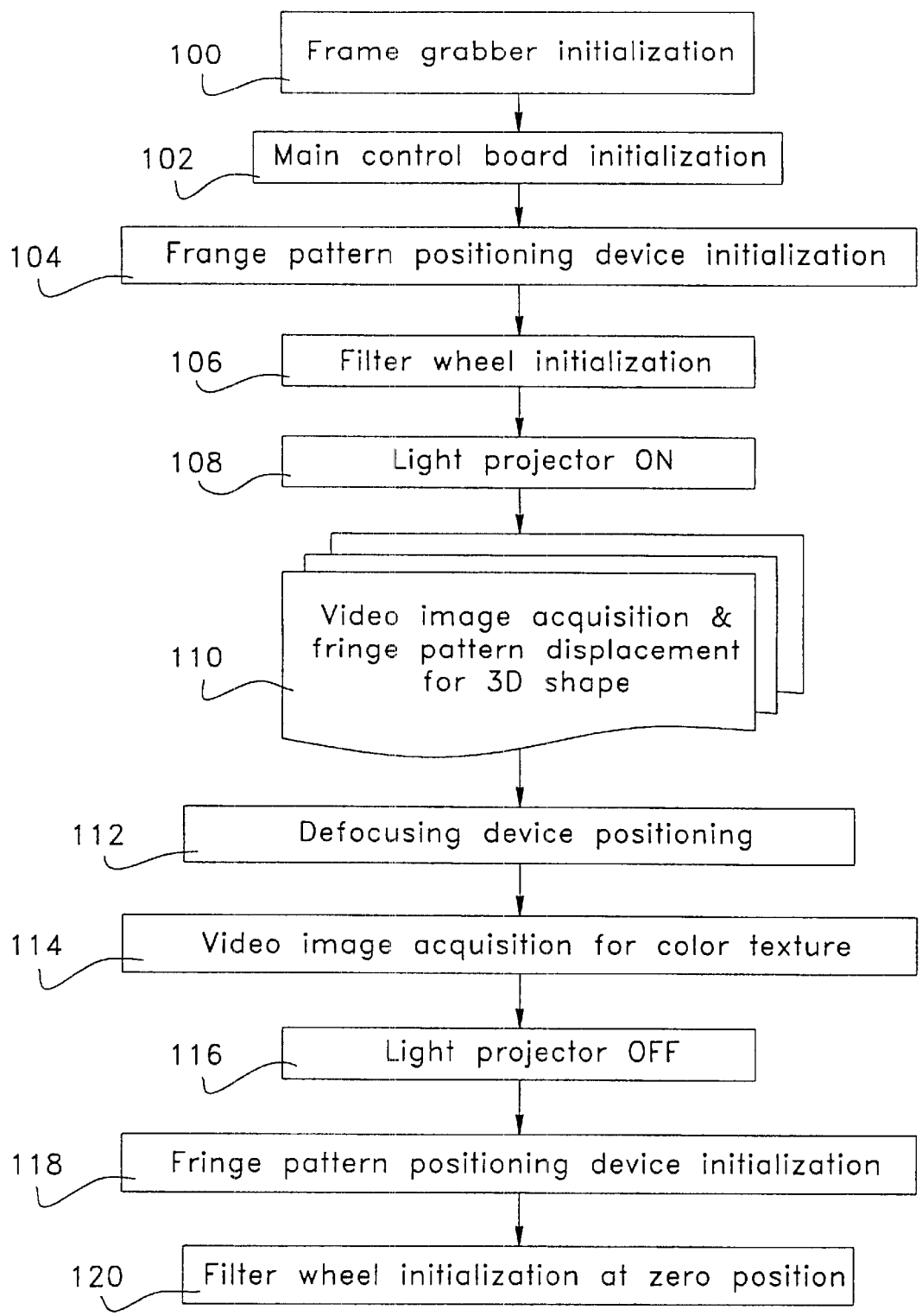
FIG. 6 is a flow chart illustrating an example of a control sequence for a 3D acquisition using a digitizer according to the present invention.

Referring to FIG. 6, there is shown a flow chart depicting a control sequence 3D acquisition process carried out by the system according to the invention. The frame grabber 60 and the main control board 48 are first initialized, as depicted by blocks 100 and 102. The grating device 12 and the multi-functional optical device 32 are also initialized as depicted by blocks 104 and 106. Then, the projector 6 is turned ON as depicted by block 108, and the video image acquisition and fringe pattern shifting processes take place as depicted by block 110. Afterward, one of the defocusing devices 42 is set into position and the video image acquisition process is triggered once again for color texture purposes, as depicted by blocks 112 and 114. The projector 6 is subsequently turned OFF and the grating device 12 and the multi-functional device 32 are initialized once again to be ready for the next sequence, as depicted by blocks 116, 118 and 120.

In order to use the digitizer 2 on a practical basis for creating a complete model of a full human body, different (complementary) views obtained by the digitizer 2 must be put together to form a complete 3D model. This implies registering the views together, merging the 3D points, and merging the texture to form a unique model containing the information of the complete body.

The first step consists in putting all of the 3D models in a same reference frame; this is called the registration. To do this, one view and its reference frame must arbitrarily be chosen to be the reference coordinate in which all of the views of the human body under digitization are intended to be represented. This model is called the fixed model. At the end of this process, all the 3D points of the models will be represented in the reference frame of the fixed model.

By tagging three texture points belonging to both the fixed model and a second model, it will become possible to put this second model in the world of the fixed one. Of course, these two models have preferably some overlapping points and texture. A first approximation of the transformation needed to put the second model in the right place is computed by superposing the three tagged points. As many tagged points as desired can be used to compute this initial solution, but a minimum of three is required: the better the initial solution is, the faster and more accurate the final solution will be. Then an algorithm is used to minimize the distance between all of the overlapping regions of the two views. The second model being now in the reference frame of the fixed one, the other model can be tagged to this one, and the process just described is then repeated. This procedure must be repeated until all of the models are in the same world. As some errors can be distributed along in this iterative process (mostly caused by the noise coming from the acquisition procedure), an algorithm that minimize the total distance between all of the models is preferably ultimately used. The final result is the views being placed in a fashion representative of the human body under digitization.

The second step consists of merging all the points from the separate views to form one 3D model. This can be done either by a cylindrical projection or by a cubical projection. To merge a human body, the use of a cubical projection is preferably used, as some parts of the body are not fully visible from a cylindrical point of view. Some weighted averaging is used when more than one point represent the univocal surface to be obtained. The final number of 3D points representing the final model can be determined at this step.

Finally, the textures of the different views are merged together and the resulting 2D bitmap is attached to the 3D points of the model. This can be either done by a cylindrical or a cubical projection. Again, cubical projection is preferably used, for the same reason mentioned for the merging of the 3D points. As some parts of the texture of the individual models overlap, a weighted average is used to get the final texture. The weight is representative of the reliability of each of the 2D texture points, determined by the angle between the model's normal and the camera during the capturing of the 3D points and 2D texture. The final model is a polygonal mesh. The number of points representing the surface can, if desired, be reduced to an appropriate value asked by the intended use of the full human body 3D model.

While embodiments of this invention have been illustrated in the accompanying drawings and described above, it will be evident to those skilled in the art that changes and modifications may be made therein without departing from the essence of this invention. All such modifications or variations are believed to be within the scope of the invention as defined by the claims appended hereto.

What is claimed is:

1. An optical 3D digitizer for digitizing an object, comprising:
   - a white light source adapted to produce white light;
   - a projection lens optically coupled to the white light source and arranged to project the white light toward the object whereby the object has a fully illuminated side;
   - grating means optically coupled between the white light source and the projection lens, for controllably producing a fringe pattern in the light projected by the projection lens; and first and second cameras positioned aside from the projection lens and aligned in angled directions with respect to each other so that the cameras have complementary fields of view directed on the illuminated side of the object and partially overlapping with each other over a depth of measurement of the object, the cameras having respective video outputs to produce video signals representing complementary images of the object with a common image portion as a result of the fields of view being partially overlapping.

2. The optical 3D digitizer according to claim 1, wherein the cameras are mounted on opposite sides of the projection lens.

3. The optical 3D digitizer according to claim 1, wherein the cameras are monochrome cameras.

4. The optical 3D digitizer according to claim 1, wherein the cameras are color cameras.

5. The optical 3D digitizer according to claim 1, wherein the grating means comprises a grating slide extending across the white light produced by the source, and an actuating unit arranged to controllably move the slide transversely with respect to the white light to shift the fringe pattern produced in the light projected by the projection lens.

6. The optical 3D digitizer according to claim 1, further comprising a multi-functional rotatable disk having circumferentially distributed optical elements selectively moveable in optical registry with the grating means and the projection lens by controlled rotation of the disk, and an actuating unit arranged to controllably rotate the disk, the optical elements including at least one defocusing element suppressing the fringe pattern produced by the grating means and providing uniform illumination by the white light projected on the object.

7. The optical 3D digitizer according to claim 6, wherein the optical elements further include an aperture, at least one shutter, and at least one filter filtering out a predetermined range of colors.

8. The optical 3D digitizer according to claim 1, wherein the fringe pattern includes a set of encoding points having absolute 3D positions determinable in the images captured by the cameras using experimentally predefined functions, the encoding points being positioned so that each one of the cameras captures at least one of the encoding points.

9. The optical 3D digitizer according to claim 1, further comprising a main control board having a peripheral interface, and a control unit connected to the peripheral interface, the grating means and the white light source, the control unit controlling use of the grating means and operation of the white light source in response to commands received through the peripheral interface.

10. The optical 3D digitizer according to claim 9, wherein the grating means comprises a grating slide extending across the white light produced by the source, and an actuating unit arranged to controllably move the slide transversely with respect to the white light to shift the fringe pattern produced in the light projected by the projection lens, the device further comprising:

a multi-functional rotatable disk having circumferentially distributed optical elements selectively moveable in optical registry with the grating means and the projection lens by controlled rotation of the disk, and an actuating unit arranged to controllably rotate the disk, the optical elements including an aperture, at least one shutter, at least one filter, and at least one defocusing element suppressing the fringe pattern produced by the grating means and providing uniform illumination by the white light projected on the object;

a motor driver board connected between the control unit and the motorized rotatable disks and driving the actuating units thereof in response to selective control signals produced by the control unit; and a lamp driver board connected between the control unit and the white light source and driving the white light source in response to an operation control signal produced by the control unit.

11. The optical 3D digitizer according to claim 10, further comprising a casing enclosing the cameras, the projection lens, the white light source, the grating means, the multi-functional disk, the driver boards, the control unit, and power supply means for producing power supply signals compatible with electronics of the boards, the white light source and the cameras, the casing having external connectors connected to the cameras, the peripheral interface and the power supply means.

12. An optical 3D digitizer system for digitizing an object, comprising:

an optical 3D digitizer including:
a white light source adapted to produce white light;
a projection lens optically coupled to the white light source and arranged to project the white light toward the object whereby the object has a fully illuminated side;
grating means optically coupled between the white light source and the projection lens, for selectively producing a fringe pattern in the light projected by the projection lens;
first and second cameras positioned aside from the projection lens and aligned in angled directions with respect to each other so that the cameras have complementary fields of view directed on the illuminated side of the object and partially overlapping with each other over a depth of measurement of the object, the cameras having respective video outputs to produce video signals representing complementary images of the object with a common image portion as a result of the fields of view being partially overlapping; and
a control circuit connected to the white light source and the grating means;
a computer including a frame grabber having inputs for receiving the video signals from the cameras, the computer having a communication link with the control circuit of the digitizer.

13. The optical 3D digitizer system according to claim 12, wherein the computer comprises means for:

extracting a 3D data set per pixel from the images with structured light projection as a result of the fringe pattern being produced by the grating means in the light projected on the object, the 3D data set representing a relative 3D position of each pixel in the images;

detecting encoding points laid at specific locations in the fringe pattern, the encoding points having absolute 3D positions determinable in the images captured by the cameras using experimentally predefined functions;

converting the relative 3D position of each pixel into a real 3D position using the absolute 3D position of a detected one of the encoding points;

producing texture images associated to the images captured by the cameras based on an optical intensity of the pixels defining the images; and generating a single full digitized image of the object as a function of a predefined spatial relationship between the cameras and the real 3D position of each pixel, the texture images being integrated into the digitized image.

14. The optical 3D digitizer system according to claim 13, wherein the computer further comprises means for:
determining a mean intensity value based on the intensity of the pixels in the common image portion captured by the cameras;
determining a gain factor for each complementary image based on the mean intensity value with respect to the intensity of the pixels in the common image portion; and
applying the gain factor on a corresponding one of the texture images.

15. The optical 3D digitizer system according to claim 14, wherein the mean intensity value and the gain factor are determined for each one of R, G and B channels, while the gain factors are respectively applied on each one of the R, G and B channels.

16. The optical 3D digitizer system according to claim 13, further comprising a defocusing device optically coupled between the grating means and the projection lens, the defocusing device being adapted to suppress the fringe pattern produced by the grating means and to provide uniform illumination by the white light projected on the object, the defocusing device operating when acquiring the images used to produce the texture images.

17. An optical 3D digitizing method for digitizing an object, comprising the steps of:
projecting white light toward the object using a single white light source, whereby the object has a fully illuminated side;
controllably producing a fringe pattern in the light projected on the object; and
capturing complementary images of the object illuminated by the white light using first and second cameras positioned aside from the white light source and aligned in angled directions with respect to each other so that the cameras have complementary fields of view directed on the illuminated side of the object and partially overlapping with each other over a depth of measurement of the object, the cameras having respective video outputs to produce video signals representing the complementary images of the object with a common image portion as a result of the fields of view being partially overlapping.

18. The optical 3D digitizing method according to claim 17, further comprising the steps of:
extracting a 3D data set per pixel from the images with structured light projection as a result of the fringe pattern being produced in the light projected on the object, the 3D data set representing a relative 3D position of each pixel in the images;
detecting encoding points laid at specific locations in the fringe pattern, the encoding points having absolute 3D positions determinable in the images captured by the cameras using experimentally predefined functions;
converting the relative 3D position of each pixel into a real 3D position using the absolute 3D position of a detected one of the encoding points;
producing texture images associated to the images captured by the cameras based on an optical intensity of the pixels defining the images; and
generating a single full digitized image of the object as a function of a predefined spatial relationship between the cameras and the real 3D position of each pixel, the texture images being integrated into the digitized image.

19. The optical 3D digitizing method according to claim 18, further comprising the steps of:
determining a mean intensity value based on the intensity of the pixels in the common image portion captured by the cameras;
determining a gain factor for each complementary image based on the mean intensity value with respect to the intensity of the pixels in the common image portion; and
applying the gain factor on a corresponding one of the texture images.

20. The optical 3D digitizing method according to claim 19, further comprising the steps of:
defocusing the white light projected on the object when acquiring the images used to produce the texture images, to suppress the fringe pattern and to provide uniform illumination by the white light projected on the object.

* * * * *